United States Patent Office 3,272,586
Patented Sept. 13, 1966

3,272,586
MIXTURES OF PHENYL SULFONAMIDO-HALO-BENZENE AZO AMINO-NAPHTHOL SULFONIC ACIDS
Franz Frisch, Porza, Ticino, Switzerland, assignor to Sandoz Ltd., Basel, Switzerland
No Drawing. Filed Nov. 27, 1963, Ser. No. 326,354
Claims priority, application Switzerland, July 24, 1959, 76,170/59; June 30, 1960, 7,397/60
6 Claims. (Cl. 8—26)

The present application is a continuation-in-part application to our co-pending application Ser. No. 44,526, filed on July 22, 1960, now abandoned, and relates to monoazo dye mixtures.

This invention relates to a composition of a mixture of two to three monoazo dyes, all of which correspond to the formula

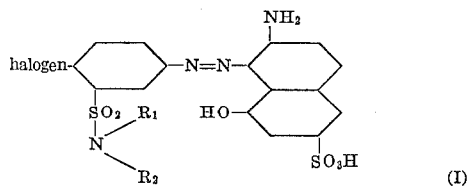

wherein halogen represents a member selected from the group consisting of chlorine and bromine, $R_1$ stands for a member selected from the group consisting of hydrogen, low molecular alkyl and low molecular hydroxyalkyl, and $R_2$ stands for a member selected from the group consisting of phenyl, chlorophenyl, bromophenyl, low molecular alkyl phenyl, low molecular alkoxy phenyl and 2,3-tetramethylenephenyl;

in which formula the radicals $R_1$ and $R_2$ possess together at least 7 and at the most 10 carbon atoms and the properties of the two dyes of Formula I in the mixtures is from 80 to 20 parts of one dye of Formula I and 20 to 80 parts of the second dye of Formula I.

These new mixtures of two to three monoazo dyes which all correspond to the formula (I) can be conveniently prepared by coupling 1 mole of a mixture of diazotized amines of the formula

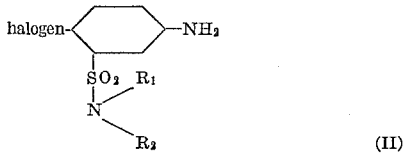

wherein halogen, $R_1$ and $R_2$ possess the afore-cited meanings, with 1 mole of 2-amino-8-hydroxynaphthalene-6-sulfonic acid.

The ratio of the two dyes of Formula I in the mixtures may vary within wide limits, e.g. 8:2 or preferably 6:4 or 1:1. The dye mixtures in the ratio 1:1 are notable for their very good dyeing and fastness properties compared with the individual dyes of Formula I.

In the ternary mixtures of dyes of Formula I also the ratio of the components may vary widely, e.g. 8:1:1, or preferably between 6:2:2 or 6:3:1. It has been found that a ratio of 1:1:1 gives mixtures with particularly good properties relative to the individual dyes of Formula I.

Examples of amines which can be employed for the production of the afore-cited mixtures of diazo compounds are:

1-amino-4-chloro-benzene-3-sulfonic acid-N-ethyl-N-phenyl-amide,
1-amino-4-chloro-benzene-3-sulfonic acid-N-methyl-N-phenyl-amide,
1-amino-4-chloro-benzene-3-sulfonic acid-N-methyl-N-(4'-methyl-phenyl)-amide,
1-amino-4-chloro-benzene-3-sulfonic acid-N-(3',6'-dimethylphenyl)-amide,
1-amino-4-chloro-benzene-3-sulfonic acid-N-ethyl-N-(2'-methylphenyl)-amide,
1-amino-4-chlorobenzene-3-sulfonic acid-N-hydroxyethyl-N-phenylamide,
1-amino-4-chlorobenzene-3-sulfonic acid-N-methyl-N-(3'-methylphenyl)-amide,
1-amino-4-chlorobenzene-3-sulfonic acid-N-phenylamide,
1-amino-4-chlorobenzene-3-sulfonic acid-N-(2',4'-dimethylphenyl)-amide,
1-amino-4-chlorobenzene-3-sulfonic acid-N-(3',5'-dimethyl-phenyl)-amide,
1-amino-4-chlorobenzene-3-sulfonic acid-N-(2',4',6'-trimethylphenyl)-amide,
1-amino-4-bromo-benzene-3-sulfonic acid-N-ethyl-N-phenylamide,
1-amino-4-methoxybenzene-3-sulfonic acid-N-ethyl-N-(4'-methylphenyl)-amide,
1-amino-4-ethoxy-benzene-3-sulfonic acid-N-(2',4'-dimethylphenyl)-amide,
1-amino-4-chlorobenzene-3-sulfonic acid-N-ethyl-N-(4'-chlorophenyl)-amide,
1-amino-4-chlorobenzene-3-sulfonic acid-N-hydroxyethyl-N-(4'-methoxyphenyl)-amide,
1-amino-4-chlorobenzene-3-sulfonic acid-N-(4'-ethoxyphenyl)-amide,
1-amino-4-acetyl-aminobenzene-3-sulfonic acid-N-ethyl-N-phenylamide,
1-amino-4-propionylaminobenzene-3-sulfonic acid N-hydroxyethyl-N-phenylamide,
1-amino-4-butanoylaminobenzene-3-sulfonic acid-N-hydroxyethyl-N-phenylamide,
1-amino-4-valerianoylaminobenzene-3-sulfonic acid-N-hydroxyethyl-N-phenylamide,
1-amino-4-lauroylaminobenzene-3-sulfonic acid-N-hydroxyethyl-N-phenylamide,
1-amino-4-decanoylaminobenzene-3-sulfonic acid-N-hydroxyethyl-N-phenylamide,
1-amino-4-dodecanoylaminobenzene-3-sulfonic acid-N-ethyl-N-phenylamide,
1-amino-4-chlorobenzene-3-sulfonic acid-N-(2,3-tetramethylenephenyl)-amide,
1-amino-4-capronylaminobenzene-3-sulfonic acid-N-hydroxyethyl-phenylamide,
1-amino-4-carboethoxyaminobenzene-3-sulfonic acid-N-ethyl-N-phenylamide,
1-amino-4-carbomethoxyaminobenzene-3-sulfonic acid-N-ethyl-N-phenylamide,
1-amino-4-carbopropoxyamino-benzene-3-sulfonic acid-N-ethyl-N-phenylamide,
1-amino-4-carbobutoxyamino-benzene-3-sulfonic acid-N-ethyl-N-phenyl-amide,
1-amino-4-carboamyloxyamino-benzene-3-sulfonic acid-N-ethyl-N-phenylamide,
1-amino-4-chloro-benzene-3-sulfonic acid-(2'-ethyl)-phenylamide.

Generally, the procedure employed is to diazotize the amine by the known methods, preferably indirectly in presence of a mineral acid such as hydrochloric acid and if necessary with the addition of an organic solvent such as glacial acetic acid or an alcohol, and then to couple the diazo compound with the 2-amino-8-hydroxynaphthalene-6-sulfonic acid in a weakly acid medium with the addition of an acid-binding agent such as sodium acetate, sodium formate, sodium bicarbonate, or sodium carbonate.

The solubility and the dyeing properties of the new dye mixtures can be improved by the addition of phosphates, e.g. sodium metaphosphate or sodium pyrophosphate, and also by levelling agents.

By the use of an equivalent amount of a mixture of two or more amines which can be diazotized simultaneously or successively in an analogous manner with 2-amino-8-hydroxynaphthalene-6-sulfonic acid, mixtures of dyes having very interesting dyeing properties are obtained.

The new dye mixtures dye animal fibers such as wool and silk, synthetic polyamide fibers and leather in bright bluish red shades.

Dyeings of these dye mixtures possess excellent fastness to chlorine and formaldehyde, very good carbonizing fastness, and good fastness to sea water, chlorinated swimming pool water, chlorine carpet washing, peroxide bleaching, cross dyeing in neutral, acetic acid and sulfuric acid baths, decatizing, pressing, heat, sulfite, potting, solvents, and permutite-treated water. The dyeings are dischargeable. The dye mixtures are highly suitable for application by high temperature processes up to 115° C. They are not sensitive to iron and copper. The dye mixtures have high saturation points on nylon and other polyamide fibers and are well suited for dyeing this class of fibers; they cover polyamide materials of irregular affinity very well, especially when applied in the presence of a sulforicinate of a high sulfonation degree.

The dye mixtures have also very good building-up properties on neutral and synthetic polyamide fibers and are applicable from acid, neutral or alkaline dyebaths, e.g. at pH values from 2 to 10, but preferably from alkaline, neutral or acid dyebaths, e.g. at pH values from 10 to 2, but preferably from a neutral to weakly acid dyebath, e.g. at pH values from 7 to 3 or 5 to 4 respectively. The dye mixtures have very good solubility in water. The dyeings on animal fibers are level, fast to light, perspiration, alkalis and acids, and have very good fastness to water, washing, rubbing, acid and alkaline milling. They are especially suitable for combination shades. Cotton, regenerated cellulose fibers, acetate, triacetate, acrylic and polyester fibers are completely reserved by the dyes.

In the following examples the parts and percentages are by weight and the temperatures in degrees centigrade.

*Example 1*

16.9 parts of finely ground 1-amino-4-chlorobenzene-3-sulfonic acid-N-ethyl-N-phenylamide and 16.7 parts of 1-amino-4-chloro-benzene-3-sulfonic acid-N-(2',4'-dimethylphenyl)-amide are dissolved in 100 parts of glacial acetic acid at 70°. The solution is cooled to 35° and 60 parts of 30% hydrochloric acid added. It is then cooled further to about 25° and with thorough stirring a solution of 8 parts of sodium nitrite in 10 parts of water is added dropwise. The diazo compound goes into solution. Any excess of nitrous acid is destroyed with aminosulfonic acid and the solution diluted with 80 parts of water and 80 parts of ice.

For coupling, 24 parts of 2-amino-8-hydroxynaphthalene-6-sulfonic acid are dissolved in 200 parts of water and 15 parts of 30% sodium hydroxide solution and the solution adjusted to a pH value of 5.5–5.8 with 8 parts of 10% acetic acid. The diazonium salt solution is run in with vigorous stirring and the acid so formed is continuously neutralized with 60–80 parts of sodium acetate. On completion of coupling the dyestuff mixture is precipitated. It is rendered weakly alkaline with sodium hydroxide solution, heated to 80–90° and then allowed to cool to 25–30°. The newly precipitated dyestuff mixture is filtered off. The filter residue in moist paste form is kneaded with 18 parts of the addition product of 20–60 molecules of ethylene oxide and a fatty amine, e.g. oleyl amine, and 10 parts of sodium pyrophosphate, and the product dried at 80–90°.

The ratio of the dye mixture is about 1:1.

The new dyestuff mixture is a dark powder which shows excellent solubility in water and dyes wool and polyamide fibers from a weakly acid to neutral bath, at a pH value of about 7 to 3 or 5 to 4 respectively, in brilliant red shades. It has very good building-up properties on neutral and synthetic polyamide fibers at the cited pH values and excellent penetrating powder in cross-wound yarn packages and is highly suitable as an element for combination shades.

When the mixture of 16.9 parts of 1-amino-4-chlorobenzene-3-sulfonic acid-N-ethyl-N-phenylamide and 16.7 parts of 1-amino-4-chlorobenzene-3-sulfonic acid-N-(2',4'-dimethylphenyl)-amide in the foregoing example is replaced by an equivalent amount of a mixture of the amines in the following table and the above procedure is used, other dye mixtures with very similar properties are obtained:

1-amino-4-chloro-benzene-3-sulfonic acid-N-ethyl-N-phenylamide,
1-amino-4-chloro-benzene-3-sulfonic acid-N-methyl-N-phenylamide,
1-amino-4-chloro-benzene-3-sulfonic acid-N-methyl-N-(4'-methyl-phenyl)-amide,
1-amino-4-chloro-benzene-3-sulfonic acid-N-(3',6'-dimethylphenyl)-amide,
1-amino-4-chloro-benzene-3-sulfonic acid-N-ethyl-N-(2'-methylphenyl)-amide,
1-amino-4-chlorobenzene-3-sulfonic acid-N-hydroxyethyl-N-phenylamide,
1-amino-4-chlorobenzene-3-sulfonic acid-N-methyl-N-(3'-methylphenyl)-amide,
1-amino-4-chlorobenzene-3-sulfonic acid-N-phenylamide,
1-amino-4-chlorobenzene-3-sulfonic acid-N-(2',4'-dimethylphenyl)-amide,
1-amino-4-chlorobenzene-3-sulfonic acid-N-(3',5'-dimethyl-phenyl)-amide,
1-amino-4-chlorobenzene-3-sulfonic acid-N-(2',4',6'-trimethylphenyl)-amide,
1-amino-4-bromo-benzene-3-sulfonic acid-N-ethyl-N-phenylamide,
1-amino-4-methoxybenzene-3-sulfonic acid-N-ethyl-N-(4'-methylphenyl)-amide,
1-amino-4-ethoxy-benzene-3-sulfonic acid-N-(2',4'-dimethylphenyl)-amide,
1-amino-4-chlorobenzene-3-sulfonic acid-N-ethyl-N-(4'-chlorophenyl)-amide,
1-amino-4-chlorobenzene-3-sulfonic acid-N-hydroxyethyl-N-(4'methoxyphenyl)-amide,
1-amino-4-chlorobenzene-3-sulfonic acid-N-(4'-ethoxyphenyl)-amide
1-amino-4-acetylaminobenzene-3-sulfonic acid-N-ethyl-N-phenylamide,
1-amino-4-propionylaminobenzene-3-sulfonic acid-N-hydroxyethyl-N-phenylamide,
1-amino-4-butanoylaminobenzene-3-sulfonic acid-N-hydroxyethyl-N-phenylamide,
1-amino-4-valerianoylamino-benzene-3-sulfonic acid-N-hydroxyethyl-N-phenylamide,
1-amino-4-lauroylaminobenzene-3-sulfonic acid-N-hydroxyethyl-N-phenylamide,
1-amino-4-decanoylaminobenzene-3-sulfonic acid-N-hydroxyethyl-N-phenylamide,
1-amino-4-dodecanoylaminobenzene-3-sulfonic acid-N-ethyl-N-phenylamide,
1-amino-4-chlorobenzine-3-sulfonic acid-N-(2,3-tetramethylenephenyl)-amide,
1-amino-4-capronylaminobenzene-3-sulfonic acid-N-hydroxyethyl-phenylamide,
1-amino-4-carboethoxyaminobenzene-3-sulfonic acid-N-ethyl-N-phenylamide, 1-amino-4-carbomethoxyaminobenzene-3-sulfonic acid-N-ethyl-N-phenylamide,
1-amino-4-carbopropoxyamino-benzene-3-sulfonic acid-N-ethyl-N-phenylamide,
1-amino-4-carbobutoxyamino-benzene-3-sulfonic acid-N-ethyl-N-phenyl-amide,
1-amino-4-carboamyloxyamino-benzene-3-sulfonic acid-N-ethyl-N-phenylamide,
1-amino-4-chloro-benzene-3-sulfonic acid-(2'-ethyl)-phenylamide.

All the mixtures of two dyes obtained are in the ratio of about 1:1.

These dyes are applied by the following procedure:

The dyebath is set with 4000 parts of water, 10 parts of anhydrous sodium sulfate, the pH value of the dyeing bath is neutral to weakly acid (pH 7 to 5.5), and 2 parts of dyestuff, and 100 parts of wetted wool fabric entered at 40°. The bath is brought to the boil in 30 minutes and maintained at the boil for 1 hour. Then 4 parts of glacial acetic acid are added and dyeing continued at the boil for 30 minutes. The pH value of the dyebath is acid, e.g. a pH value of 5.5 to 4.5. During dyeing the water lost by evaporation is continuously replaced. The red dyed wool is removed, rinsed with water and dried.

The procedure can be varied by bringing the bath to the boil and first adding 2 parts of glacial acetic acid and after 15 minutes at the boil the remaining 2 parts of glacial acetic acid.

*Example 2*

20.3 parts of finely ground 1-amino-4-chlorobenzene-3-sulfonic acid-N-ethyl-N-phenylamide and 13.4 parts of 1-amino-4-chlorobenzene-3-sulfonic acid-N-(2',4'-dimethylphenyl)-amide are dissolved in 100 parts of glacial acetic acid at 70°. The solution is cooled to 35° and 60 parts of 30% hydrochloric acid added. It is then cooled further to about 25° and with thorough stirring a solution of 8 parts of sodium nitrite in 10 parts of water is added dropwise. The diazo compound goes into solution. Any excess of nitrous acid is destroyed with aminosulfonic acid and the solution diluted with 80 parts of water and 80 parts of ice.

For coupling, 24 parts of 2-amino-8-hydroxynaphthalene-6-sulfonic acid are dissolved in 200 parts of water and 15 parts of 30% sodium hydroxide solution and the solution adjusted to a pH value of 5.5–5.8 with 8 parts of 10% acetic acid. The diazonium salt solution is run in with vigorous stirring and the acid so formed is continuously neutralized with 60–80 parts of sodium acetate. On completion of coupling the dyestuff mixture is precipitated. It is rendered weakly alkaline with sodium hydroxide solution, heated to 80–90° and then allowed to cool to 25–30°. The newly precipitated dyestuff mixture is filtered off. The filter residue in moist paste form is kneaded with 18 parts of the addition product of 20–60 molecules of ethylene oxide and a fatty amine, e. g. oleyl amine, and 10 parts of sodium pyrophosphate, and the product dried at 80–90°.

The ratio of the component dyes in the mixture is about 6:4. When the mixture of 20.3 parts of 1-amino-4-chlorobenzene-3-sulfonic acid-N-ethyl-N-phenylamide and 13.4 parts of 1-amino-4-chlorobenzene-3-sulfonic acid-N-(2',4'-dimethylphenyl)-amide in the foregoing example is replaced by an equivalent amount of a mixture of the amines named in Example 1 and the operating procedure of Example 2 is followed, other dye mixtures with very similar properties are obtained.

*Example 3*

26.9 parts of finely ground 1-amino-4-chloro-benzene-3-sulfonic acid-N-ethyl-N-phenylamide and 6.7 parts of 1-amino-4-chlorobenzene-3-sulfonic acid-N-(2',4'-dimethylphenyl)-amide are dissolved in 100 parts of glacial acetic acid at 70°. The solution is cooled to 35° and 60 parts of 30% hydrochloric acid added. It is then cooled further to about 25° and with thorough stirring a solution of 8 parts of water is added dropwise. The diazo compound goes into solution. Any excess of nitrous acid is destroyed with aminosulfonic acid and the solution diluted with 80 parts of water and 80 parts of ice.

For coupling, 24 parts of 2-amino-8-hydroxynaphthalene-6-sulfonic acid are dissolved in 200 parts of water and 15 parts of 30% sodium hydroxide solution and the solution adjusted to a pH value of 5.5–5.8 with 8 parts of 10% acetic acid. The diazonium salt solution is run in with vigorous stirring and the acid so formed is continuously neutralized with 60–80 parts of sodium acetate. On completion of coupling the dyestuff mixture is precipitated. It is rendered weakly alkaline with sodium hydroxide solution, heated to 80–90° and then allowed to cool to 25–30°. The newly precipitated dyestuff mixture is filtered off. The filter residue in moist paste form is kneaded with 18 parts of the addition product of 20–60 molecules of ethylene oxide and a fatty amine, e. g. oleyl amine, and 10 parts of sodium pyrophosphate, and the product dried at 80–90°.

The ratio of the component dyes in the mixture is about 8:2.

When the mixture of 26.9 parts of 1-amino-4-chlorobenzene-3-sulfonic acid-N-ethyl-N-phenylamide and 6.7 parts of 1-amino-4-chlorobenzene-3-sulfonic acid-N-(2',4'-dimethylphenyl)-amide in the foregoing example is replaced by an equivalent amount of a mixture of the amines named in Example 1 and the operating procedure of Example 3 is followed, other dye mixtures with very similar properties are obtained.

The formulae of the representative dye mixtures disclosed in Example 1 are as follows.

The mixture of the monoazo dyes which correspond to the formulae

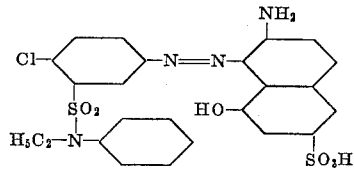

and

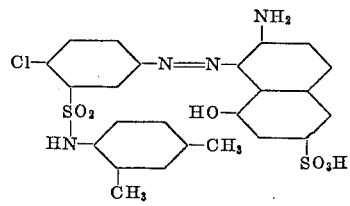

in which the components are in the ratio of 1:1.

The mixture of the monoazo dyes which correspond to the formulae

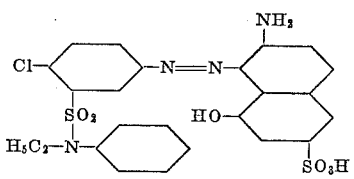

and

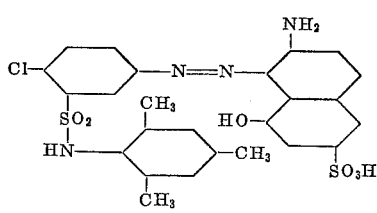

in which the components are in the ratio of 1:1.

The mixture of the monazo dyes which correspond to the formulae

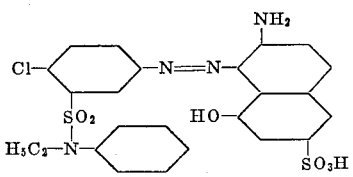

and

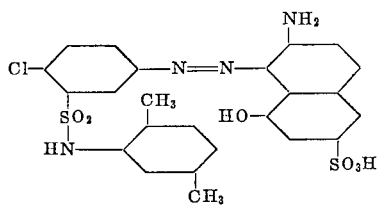

in which the components are in the ratio of 1:1.

The mixture of the monazo dyes which correspond to the formulae

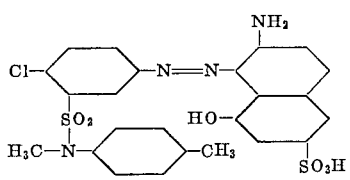

and

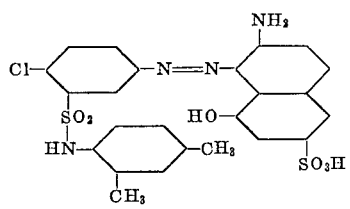

in which the components are in the ratio of 1:1.

The mixture of the mono azo dyes which correspond to the formulae

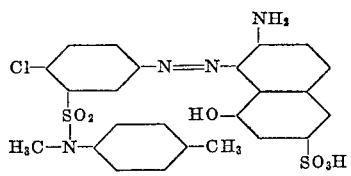

and

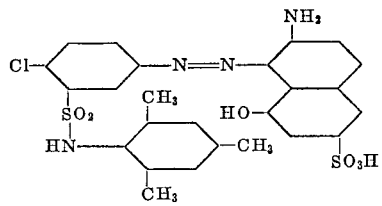

in which the components are in the ratio of 1:1.

Having thus disclosed the invention what I claim is:

1. As a composition of matter a mixture of two to three monoazo dyes, all of which correspond to the formula

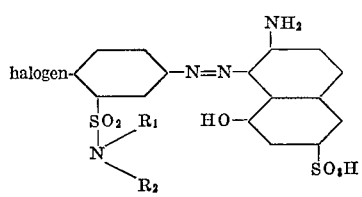

wherein halogen represents a member selected from the group consisting of chlorine and bromine, $R_1$ represents a member selected from the group consisting of hydrogen and low molecular alkyl, and $R_2$ represents a member selected from the group consisting of phenyl, chlorophenyl, bromophenyl, low molecular alkylphenyl, low molecular alkoxyphenyl and 2,3-tetramethylenephenyl; and wherein the radicals $R_1$ and $R_2$ possess together at least 7 and at the most 10 carbon atoms and the proportions of the two dyes of Formula I in the mixtures is from 80 to 20 parts of one dye of Formula I and 20 to 80 parts of the second dye of Formula I.

2. The mixture of the monoazo dyes which correspond to the formulae

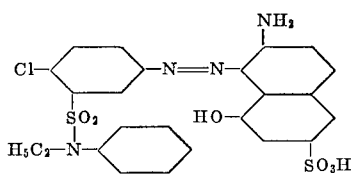

and

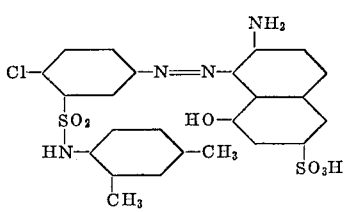

in which the components are in the ratio of 1:1.

3. The mixture of the monoazo dyes which correspond to the formulae

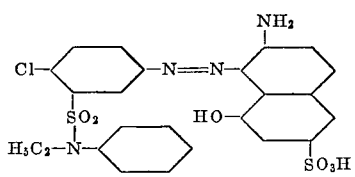

and

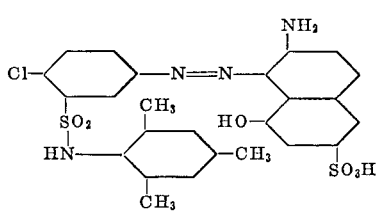

in which the components are in the ratio of 1:1.

4. The mixture of the monoazo dyes which correspond to the formulae

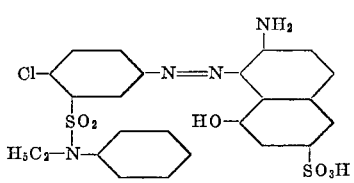

and

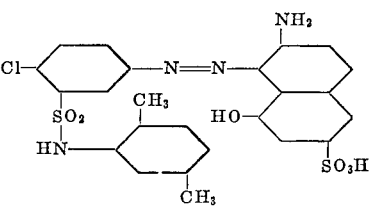

in which the components are in the ratio of 1:1.

5. The mixture of the monoazo dyes which correspond to the formulae

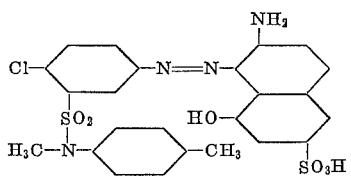

and

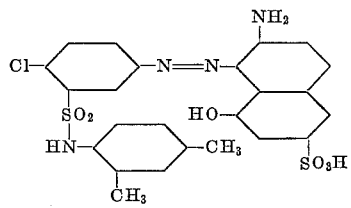

in which the components are in the ratio of 1:1.

6. The mixture of the monoazo dyes which correspond to the formulae

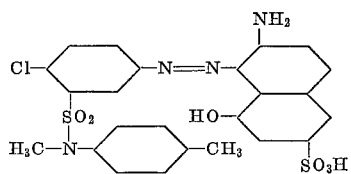

and

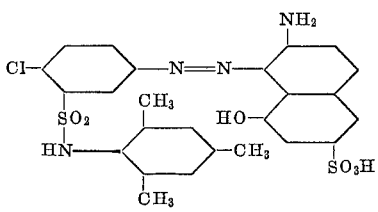

in which the components are in the ratio of 1:1.

References Cited by the Examiner

UNITED STATES PATENTS

| 1,854,846 | 4/1932 | Knecht et al. | 260—198 |
| 1,879,261 | 9/1932 | Hoyer et al. | 260—198 |

OTHER REFERENCES

Deming: General Chemistry, pp. 422–423, 5th Edition, Pub. 1944 by John Wiley and Sons, Inc., N.Y.C.

Vickerstoff: The Physical Chemistry of Dyeing, pages 16, 446 and 472–476. Pub. 1954 by Interscience Publ. Inc., N.Y.C. TP893V5 1954.

NORMAN G. TORCHIN, *Primary Examiner.*

D. LEVY, *Assistant Examiner.*